United States Patent
Tofighbakhsh et al.

(10) Patent No.: US 9,813,840 B2
(45) Date of Patent: Nov. 7, 2017

(54) METHODS, DEVICES AND COMPUTER READABLE STORAGE DEVICES FOR GUIDING AN APPLICATION PROGRAMMING INTERFACE REQUEST

(71) Applicant: AT&T Intellectual Property I, L.P., Atlanta, GA (US)

(72) Inventors: Mostafa Tofighbakhsh, Cupertino, CA (US); Shyam Parekh, Orinda, CA (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 250 days.

(21) Appl. No.: 14/084,998

(22) Filed: Nov. 20, 2013

(65) Prior Publication Data
US 2015/0142871 A1    May 21, 2015

(51) Int. Cl.
*H04L 29/08*    (2006.01)
*H04W 4/00*    (2009.01)

(52) U.S. Cl.
CPC .................. *H04W 4/003* (2013.01)

(58) Field of Classification Search
None
See application file for complete search history.

(56) References Cited

U.S. PATENT DOCUMENTS

| | | | | |
|---|---|---|---|---|
| 6,779,184 B1* | 8/2004 | Puri | ................. | G06F 9/542 709/238 |
| 7,523,170 B1* | 4/2009 | Allen | ................. | G06F 15/173 709/217 |
| 8,001,270 B2 | 8/2011 | Ferlitsch | | |
| 2001/0019554 A1* | 9/2001 | Nomura | ................. | H04L 45/50 370/389 |
| 2005/0071507 A1* | 3/2005 | Ferlitsch | ................. | H04L 29/06 709/245 |
| 2006/0069714 A1* | 3/2006 | Blount | ................. | G06Q 10/10 709/203 |
| 2008/0227484 A1* | 9/2008 | Auvray | ................. | H04L 69/329 455/552.1 |
| 2010/0329149 A1* | 12/2010 | Singh | ................. | H04L 12/28 370/254 |
| 2011/0145842 A1* | 6/2011 | Tofighbakhsh | ....... | H04L 45/306 719/328 |
| 2011/0270685 A1* | 11/2011 | Marks | ................. | G06Q 30/02 705/14.66 |

(Continued)

OTHER PUBLICATIONS

Office Action mailed Apr. 11, 2012 in U.S. Appl. No. 12/638,601.

(Continued)

*Primary Examiner* — Philip Chea
*Assistant Examiner* — Hassan Khan
(74) *Attorney, Agent, or Firm* — Hartman & Citrin LLC (57) ABSTRACT

An application programming interface request is guided to an application server. The application programming interface request is received from a communication device via a communication network. Data indicating a context of the communication network in relation to the communication device is obtained. An application server to which to send the application programming interface request is determined based on the data indicating the context of the communication network in relation to the communication device.

15 Claims, 3 Drawing Sheets

(56) References Cited

U.S. PATENT DOCUMENTS

2011/0307599 A1* 12/2011 Saretto .................. G06F 9/5072
709/224
2012/0311023 A1* 12/2012 Ladd ....................... H04L 63/10
709/203
2013/0132854 A1* 5/2013 Raleigh ................. G06F 3/0482
715/738
2014/0040993 A1* 2/2014 Lorenzo .................. G06F 21/41
726/4

OTHER PUBLICATIONS

Office Action mailed Oct. 24, 2012 in U.S. Appl. No. 12/638,601.
Office Action mailed Mar. 12, 2013 in U.S. Appl. No. 12/638,601.
Notice of Allowance mailed Jul. 19, 2013 in U.S. Appl. No. 12/638,601.

* cited by examiner

METHODS, DEVICES AND COMPUTER READABLE STORAGE DEVICES FOR GUIDING AN APPLICATION PROGRAMMING INTERFACE REQUEST

TECHNICAL FIELD

The present disclosure relates generally to communication and, more particularly to providing application services.

BACKGROUND

Over the last decade, cellular carriers have developed an increasing number of services to support mobile applications. These services include, for example, mobile presence services, location-based services, multimedia messaging service (MMS), short message service (SMS) messaging, etc. These services have traditionally been accessed by very well-defined carrier-supported services.

In the last few years, carriers have implemented Application Programming Interfaces (APIs) that provide a front-end to these services. APIs allow servers in the cloud to fulfill requests from the mobile applications.

Most current mobile applications are client/server based, such that applications running on mobile communication devices are typically responsible for passing the API parameters to the API servers that fulfill the API requests. Currently, no network context is taken into account in determining which API server may be best suited to fulfill an API request. Rather, the API request from mobile communication device is simply routed to any API server that can fulfill the request.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for guiding an application programming interface request. The method includes receiving, by a processor, an application programming interface request from a communication device via a communication network and obtaining, by the processor, data indicating a context of the communication network in relation to the communication device. The method further includes determining an application server to which to send the application programming interface request based on the data indicating the context of the communication network in relation to the communication device.

According to another embodiment, a device is provided for guiding an application programming interface request. The device comprises a processor and a memory. The memory has instructions stored thereon which, when executed by the processor, cause the processor to perform operations. The operations include receiving an application programming interface request from a communication device via a communication network and obtaining data indicating a context of the communication network in relation to the communication device. The operations further include determining an application server to which to send the application programming interface request based on the data indicating the context of the communication network in relation to the communication device.

According to another embodiment, a computer readable storage device is provided having instructions stored thereon which, when executed by a processor, cause the processor to perform operations for guiding an application programming interface request. The operations include receiving an application programming interface request from a communication device via a communication network and obtaining data indicating a context of the communication network in relation to the communication device. The operations further include determining an application server to which to send the application programming interface request based on the data indicating the context of the communication network in relation to the communication device.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, a Guided Network API Server within a communication network obtains network context data in relation to a communication device and selects an API server to fulfill an API request based on the context data. By taking the network context into account, the Guided Network API Server is able to select the API server which is most suitable for fulfilling an API request, thereby resulting in efficient and effective request fulfillment.

Figure 1:
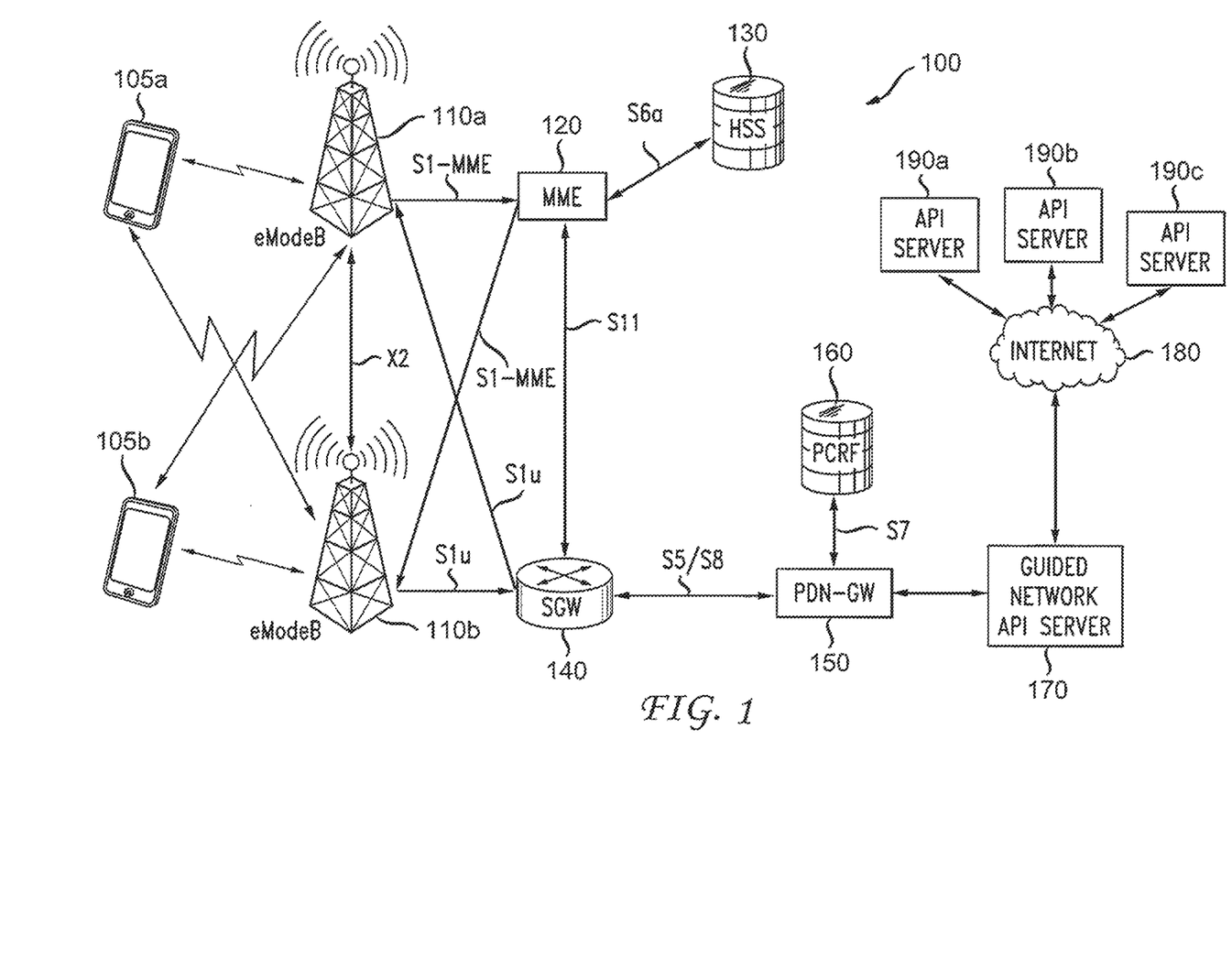
FIG. 1 illustrates an environment in which a guided network application programming interface server may be implemented according to an illustrative embodiment.

FIG. 1 illustrates an environment in which the Guided Network API Server may be implemented according to an illustrative embodiment. As shown in FIG. 1, a Guided Network API Server 170 may be part of a communication network 100.

The communication network 100 shown in FIG. 1 is a Long Term Evolution (LTE) network in communication with mobile communication devices 105A and 150B and with a packet data network, such as the Internet 180. It should be appreciated that the communication network 100 is described and illustrated as an LTE network operating according to LTE standards by way of example. However, the concepts described herein may be applicable to any communication network capable of sending API requests and receiving API responses. Such networks may operate according to a protocol dictated by telecommunications standards, such as Global System for Mobile communications (GSM) and Universal Mobile Telecommunications System (UMTS). In addition, the communication network 100 may be implemented using wireless networks that use any existing or yet to be developed telecommunications technology.

For example, some other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers. In addition, other types of networks may be used, e.g., Wireless LAN (WLAN), WiFi, etc., either alone or in combination with the cellular networks. Further, although not shown for simplicity of illustration, it should be appreciated that the communication network 100 includes various other components, e.g., servers and databases, for providing various network services, such as location services, presence services, emergency services, MMS, SMS, billing, etc.

Referring again to FIG. 1, the communication network 100 includes a radio access network (RAN). The RAN includes enhanced NodeB's (eNodeB's) 110A and 110B which receive and transmit radio signals from the communication devices 105A and 105B via radio interfaces. Each eNodeB 110A and 110B includes one or more transceivers for transmission and reception of data, e.g., data packets, across the radio interfaces to and from the communication devices 105A and 105B. In the embodiment shown in FIG. 1, each eNode B 110A and 110B is configured to operate according to the LTE network standards. Although the communication devices 105A and 105B are illustrated as mobile communication devices, it should be appreciated that these devices may be implemented with any communication device having applications which can exchange API requests and API responses.

The communication network 100 also includes core network elements for communicating with the RAN and the Internet 180. These elements include a Mobile Management Entity (MME) 120 which is in communication with the eNodeB's 110A and 110B via S1-MME interfaces. The MME 120 authenticates the communication devices 105A and 105B by interacting with the Home Subscriber Server (HSS) 130 via the S6a interface. The HSS 130 contains a database of subscription-related information, such as subscriber profiles for performing authentication and authorization of the mobile communication devices 105A and 105B. The HSS 130 can provide network context data in relation to the mobile communication devices 105A and 105B, e.g., information about the location and IP addresses associated with the communication devices 105A and 105B, information regarding the device types of the communication devices 105A and 105B and states of the communication devices 105A and 105B.

The MME 120 communicates with a Serving Gateway (SGW) 140 over an S11 interface, indicating to the SGW 140 whether the communication devices 105A and 105B are authenticated/authorized. If the communication device 105A and/or 105B sending a request is authenticated/authorized to communicate via the communication network 100, the SGW 140 routes data packets received from and directed to the eNodeB's 110A and 110B via S1u interfaces. The SGW 140 also manages and stores network context data in relation to the mobile communication devices 105A and 105B, e.g., parameters of the IP bearer service, network internal routing information, etc.

The SGW 140 routes data packets, including API requests, to a packet data network gateway (PDN-GW) 150. The PDN-GW 150 provides connectivity from the communication devices 105A and 105B to external packet data networks, such as the Internet 180. The PDN-GW 150 performs policy enforcement, packet filtering for each user, charging support, lawful interception and packet screening. As part of packet filtering, the PDN-GW 150 performs deep packet inspection (DPI) to determine whether an API request is "tagged" for fulfillment by the Guided Network API Server 170, as described in more detail below. Although only one PDN-GW 150 is shown for simplicity of illustration, it should be appreciated that a mobile communication device may have simultaneous connectivity with more than one PDN-GW for accessing multiple packet data networks.

The PDN-GW 150 is in communication with a Policy and Rules Function (PCRF) component 160 via a S7 interface. The PCRF 160 accesses subscriber databases, charging systems, operation support systems, etc., in real time, supporting the creation of rules and then automatically making policy decisions for each subscriber active on the communication network 100. The communication network 100 may provide multiple communication services having various qualities of service (QoS) levels and charging rules. The PCRF 160 provides information regarding these various levels of service and charging rules to the PDN-GW 150.

According to illustrative embodiments, the PDN-GW 150 inserts network context data in relation to a communication device that initiates an API request into the API request and forwards the request with the inserted context data to the Guided Network API Server 170. If the communication devices 105A and 105B are capable of having applications guided by the Guided Network API Server 170, the API requests from those devices may be considered to be "tagged" for guidance by the Guided Network API Server 170.

The network context data may include information relating to the status of the network e.g., network load, congestion, etc. This information may be provided to the PDN-GW 150 from the SGW 140. The network context data may also include information regarding the communication device, e.g., a location of the communication device, a speed of the communication device, a quality of service level associated with the communication device, a subscriber profile, etc. This information may be provided to the PDN-GW 150 from, e.g., the communication devices 105A and 105B.

The data packets, including the API requests with inserted network context data, are sent to the Guided Network API Server 170 from the PDN-GW 150. The Guided Network API Server 170 determines, based on the network context data in relation to the communication device that initiated the API request, which of the API servers 190A, 190B, and 190C to send the request to, via the Internet 180. This decision may be based on criteria included in the network context, e.g., network congestion and load, a location of the communication device 105A, 105B, a speed with which the location of the communication device 105A, 105B is changing, a subscriber profile (including quality of service levels subscribed to), user behavior and demands of the API request and the application on the communication device 105A, 105B that sent the API request. This network context data may be stored within a look-up table in the Guided Network API Server 170 and continually updated as the Guided Network API Server 170 receives updated network context data.

The Guided Network API Server 170 continuously receives network context data for those applications that have registered with the network entities as described above. Based on the network context data in relation to a communication device that initiates an API request, the Guided Network API Server 170 selects an API server that will best fulfill the API request, e.g., in terms of speed and/or accuracy.

As the Guided Network API Server 170 receives and stores network context data in relation to various communication devices, the Guided Network API Server 170 may "learn" how API requests are best fulfilled for particular communication devices under various circumstances, and the Guided Network API Server 170 may become predictive in determining how best to fulfill an API request.

According to an illustrative embodiment, the Guided Network API Server 170 sends the API request, via, e.g., the Internet 180 to the selected API server. The selected API server 190A, 190B, 190C fulfills the request and sends an API response back to the Guided Network API Server 170 via, e.g., the Internet 180. The API server 190A, 190B, 190C processing the API request with the inserted context can provide accurate responses to the API request, based on the network context. The fulfilled API request is sent as an API response from the selected API server 190A, 190B, 190C to the communication device 105A, 105B via the Internet 180, the Guided Network API Server 170, the PDN-GW 160, the SGW 140, and the eNodeB (110A or 110B).

According to an alternative embodiment, rather than sending the API request to an API server 190A, 190B, 190C to fulfill the API request, the Guided Network API Server 170 may act as a proxy server to fulfill the API request. As indicated above, API requests that are to be fulfilled by the Guided Network API Server 170 are "tagged" by the communication devices 105A and 105B. Upon deep packet inspection, the PDN-GW 150 detects these tags and directs the Guided Network API Server 170 to fulfill the API request, rather than sending the request to an API server 190A, 190B, 190C. In this scenario, the fulfilled API request is sent as an API response from the Guided Network API Server 170 to the communication device that initiated the API request via the PDN-GW, the SGW 140 and the eNodeB (110A or 110B).

As an illustrative example, consider an application on a mobile communication device 105A. The application may issue an API request for a video stream but may not provide any information regarding a desired quality of service or quality of experience, rate adaptation, etc. Assuming that the application has registered with the network components, the API request is routed through the network components (e.g., the MME 120, the SGW 140, and the PDN-GW 150), and the network components insert network context data in relation to the communication device 105A, e.g., resource capabilities and options, such as Codec rate, and quality aspects. Upon receiving the API request with the inserted context data, the Guided Network API Server 170 may determine the best streaming option based on the network context and the application demands. Then, the Guided Network API Server 170 may forward the API request to the API server 190A, 190B, or 190C that is able to fulfill the API request with the selected streaming option.

As another illustrative example, consider a mobile communication device 105A having an application that issues an API request for emergency services. Assuming that the application issuing the API request has registered with the network components, the API request is routed through the network components, and the network components insert network context data in relation to the mobile communication device, e.g., information regarding the location of the communication device 105A, the speed with which the mobile communication device 105A is moving, the direction in which the communication device 105A is moving, etc. The Guided Network API Server 170 may run a guiding algorithm to respond to the communication device 105A, indicating where to go to obtain emergency services. As the Guided Network API Server 170 continuously receives network context data, the Guided Network API Server 170 may continuously adapt its response to the communication device 105A. For example, if the communication device 105A moves away from a source of emergency services to which the Guided Network API Server 170 was directing the communication device 105A and gets closer to another source of emergency services, the Guided Network API Server 170 may direct the communication device 105A to move towards the other source of emergency services. In this scenario, the Guided Network API Server 170 may be considered to be acting as a proxy API server.

According to an illustrative embodiment, the Guided Network API Server 170 may select an API server 190A, 190B, 190C that is able to fulfill a request in manner that meets a minimum quality threshold. Similarly, if the Guided Network API Server 170 is acting as a proxy server to respond to an API request, the Guided Network API Server 170 may fulfill the request in a manner that meets a minimum quality threshold.

In the emergency services scenario described above, for example, a minimum quality threshold may be 500 feet from a source of emergency services. In this scenario, the Guided Network API Server 170 may indicate to the communication device 105A to remain in its current location if the communication device is within 500 feet of a source of emergency services.

The minimum quality threshold may be set in advance by a user and/or may be determined by the Guided Network API Server 170 based, e.g., upon the subscriber profile, etc. Also, the minimum quality threshold may be overridden by a user. For example, referring again to the emergency services scenario, if the Guided Network API Server 170 directs the communication device 105A to stay in its current location, a user of the communication device may respond with a request to override this direction.

Although the embodiments described above are directed to API requests received from a mobile communication device 105A, 105B, it should be appreciated that an API server, e.g., API server 190A, 190B, or 190C may initiate an API request, e.g., on behalf of an enterprise. In this scenario, the Guided Network API Server 170 receives the API request from the API server 190A, 190B, 190C that initiates the API request, and directs the API request to the communication device 105A, 105B with which the API request is concerned. The Guided Network API Server 170 may use stored network context data to direct the API request to the communication device 105A, 105B. For example, the Guided Network API Server 170 may determine, from the stored network context data, where there is congestion in the network and may route the API request to the communication device 105A, 105B along a network route that avoids the congestion.

Figure 2:
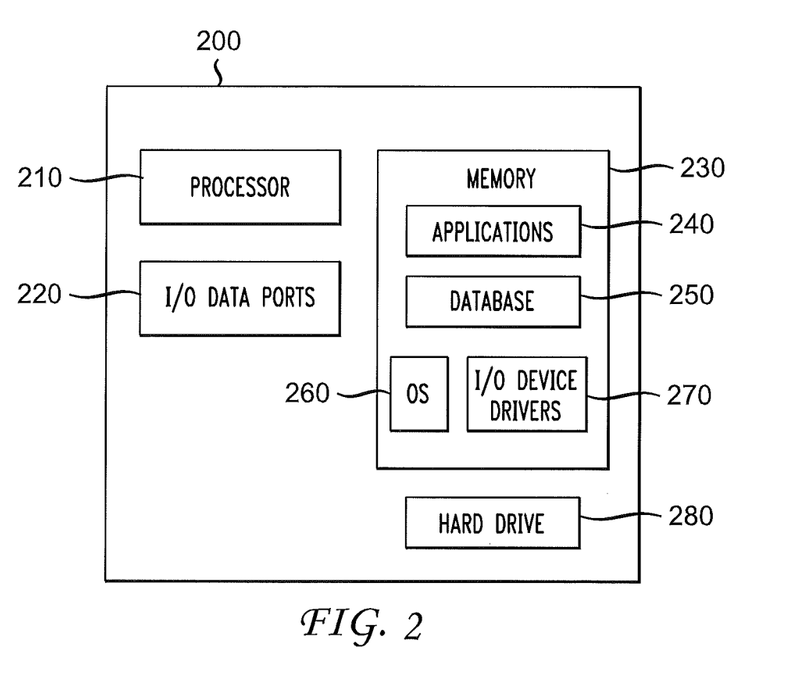
FIG. 2 illustrates a block diagram of a computing device with which a guided network application programming interface server may be implemented according to illustrative embodiments.

FIG. 2 is a block diagram of a computing device 200 with which the Guided Network API Server 170 shown in FIG. 1 may be implemented. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer-readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the components shown in FIG. 2, excluding propagating signals.

According to an illustrative embodiment, the computing device 200 may be implemented in any suitable computing device having a connection to the PDN-GW 150 and a packet data network, such as the Internet 180, via any suitable network(s) and network connections. For example, the computing device 200 may be implemented as a component within a server in communication with the PDN-GW 150 and the API servers 190A, 190B, and 190C.

Referring to FIG. 2, the computing device 200 includes a processor 210 that receives an API request from a communication device, e.g., communication devices 105A and 105B, via a communication network (including, the RAN components and core network components shown in FIG. 1). The API request is received via the I/O data ports 220. The processor 210 obtains data indicating a context of the communication network in relation to the communication device, selects an API server, e.g., API server 190A, 190B, or 190C, to which to send the API request, and sends the API request to the selected API server via the I/O data ports 220. The processor 210 also receives an API response from the API server and transmits an API response to the communication device via the I/O data ports 220. The I/O data ports 220 can be implemented with, e.g., an interface including an antenna or other suitable type of transceiver through which data and signals may be transmitted and received wired and/or wirelessly.

The computing device 200 also includes a physical hard drive 280. The processor 210 communicates with the memory 230 and the hard drive 280 via, e.g., an address/data bus (not shown). The processor 210 can be any commercially available or custom microprocessor. Additionally, although illustrated and described as one processor, the processor 210 could be implemented with multiple processors, which could include distributed processors or parallel processors in a single machine or multiple machines. Further, it should be appreciated that the processor can be used in supporting a virtual processing environment. Also, the processor could include a state machine, application specific integrated circuit (ASIC), programmable gate array (PGA) including a Field PGA, or a state machine.

The memory is 230 is representative of the overall hierarchy of memory devices containing the software and data used to implement the functionality of the device 200. The memory 230 can include, but is not limited to the types of memory devices described above. As shown in FIG. 2, the memory 230 may include several categories of software and data used in the device 200, including applications 240, a database 250, an operating system (OS) 260, and input/output (I/O) device drivers 270.

The I/O device drivers 270 may include various routines accessed through at least one of the OS 260 by the applications 240 to communicate with devices and certain memory components.

The applications 240 can be stored in the memory 230 and/or in a firmware (not shown) as executable instructions, and can be executed by the processor 210 to perform operations. When the processor 210 executes instructions to perform "operations", this could include the processor performing the operations directly and/or facilitating, directing, or cooperating with another device or component to perform the operations. The applications 240 include various programs that implement the various features of the device 200. For example, the applications 240 may include applications for receiving API requests including network context data, selecting an API server for fulfilling the API request based on the network context data, sending the API request to the selected server, receiving an API response from the selected API server, and sending the API response to the communication device that initially sent the API request. These applications may also include guiding algorithms which the device 200 may use for responding to API requests.

The database 250 represents the static and dynamic data used by the applications 240, the OS 260, the I/O device drivers 270 and other software programs that may reside in the memory 230. The database may 250 may be used to store network context data in relation to the communication devices 105A and 105B. As described above, the network context data may be stored in the form of a look-up table.

While the memory 230 is illustrated as residing proximate the processor 210, it should be understood that at least a portion of the memory 230 can be a remotely accessed storage system, for example, another server in communication with the processor 210 via the Internet 180, a remote hard disk drive, a removable storage medium, combinations thereof, and the like. Thus, any of the data, applications, and/or software described above can be stored within the memory 230 and/or accessed via network connections to other data processing systems (not shown) that may include a local area network (LAN), a metropolitan area network (MAN), or a wide area network (WAN), for example.

Figure 3:
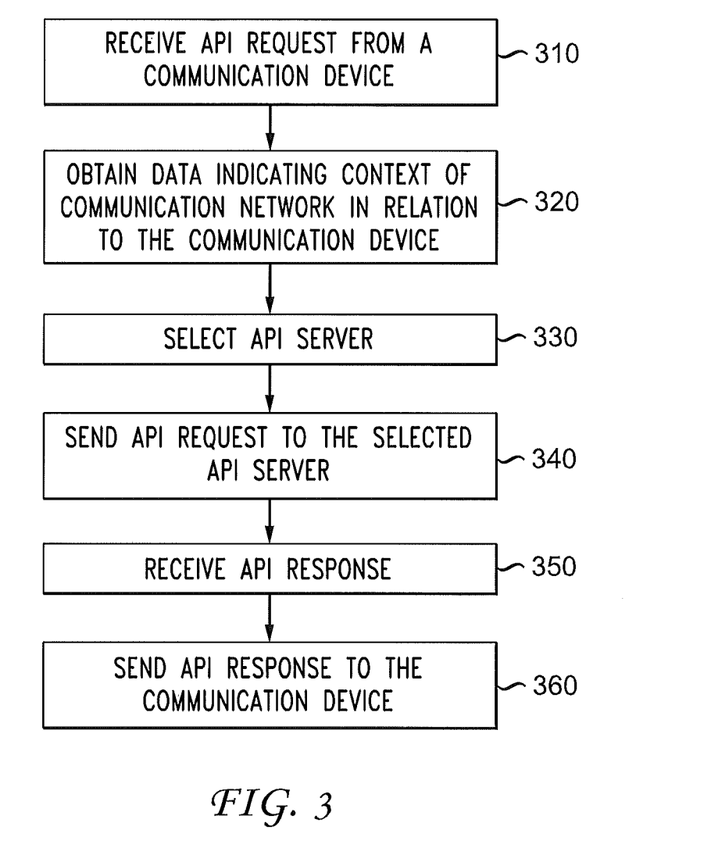
FIG. 3 illustrates a method for guiding an application programming interface request according to illustrative embodiments.

FIG. 3 illustrates a method for guiding an API request according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 3, the method begins at step 310 at which an API request is received from a communication device, such as devices 105A and 150B, via a communication network, such as the RAN and core network components described with reference to and illustrated as part of the communication network 100 shown in FIG. 1. The API request is received at the Guided Network API Server 170, which is also part of the communication network 100. At step 320, the Guided Network API Server 170 obtains data indicating the context of the communication network in relation to the communication device 105A, 105B. This data may be inserted by the core network components, e.g., PDN-GW 150, the MME 120 and the SGW 140 into the API request and stored within the Guided Network API Server 170. Alternatively, this data may be inserted by network adjunct engines and stored within the Guided Network API Server 170. Based on the network context data, at step 330 the Guided Network API Server 170 selects an API server among a plurality of API servers, e.g., the API server 190A, 190B, and 190C, to which to send the API request. From step 330, the Guided Network API Server 170 sends the API request to the selected API server 190A, 190B, 190C at step 340. At step 350, the Guided Network API Server 170 receives the API response fulfilled by the selected API server 190A, 190B, 190C, and at step 360, the Guided Network API Server 170 sends the API response to the communication device that sent the API request via the communication network 100.

Although not shown in FIG. 3, it should be appreciated that the Guided Network API Server 170 may act as a proxy server to fulfill the API request. In such a case steps 340 and 350 may be eliminated.

According to illustrative embodiments, insertion of network context into API requests provides for a better relationship between applications and API servers fulfilling requests from applications. The applications may be simplified, as they will not be required to provide network context, and the API servers may become more intelligent, as they will be better able to respond to the API requests, knowing about the network context.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method comprising:
   receiving, by a guided network application programming interface server comprising a processor, an application programming interface request routed via a communication network to the guided network application programming interface server from a packet data network gateway, wherein the application programming interface request originates from a communication device, wherein the packet data network gateway receives the application programming interface request from a serving gateway of the communication network, and wherein the serving gateway receives the application programming interface request from an eNodeB that receives the application programming interface request from the communication device;
   obtaining, by the processor, from the application programming interface request, data indicating a context of the communication network in relation to the communication device, wherein the data indicating the context of the communication network in relation to the communication device is inserted in the application programming interface request by a mobile management entity of the communication network, the serving gateway of the communication network, and the packet data network gateway prior to the guided network application programming interface server receiving the application programming interface request, wherein the data indicating the context of the communication network in relation to the communication device comprises information about a location of the communication device, information regarding a speed at which the communication device is moving and a direction in which the communication device is moving, information regarding a device type of the communication device, information about a state of the communication device, and a quality of a service level associated with the communication device, wherein the information about the location of the communication device, the information regarding the device type of the communication device, and the information about the state of the communication device are provided by a home subscriber server to the mobile management entity, and wherein the information about the quality of the service level associated with the communication device is provided by the communication device; and
   determining, by the processor, an application programming interface server to which to send the application programming interface request based at least in part on the data indicating the context of the communication network in relation to the communication device, wherein determining the application programming interface server to which to send the application programming interface request comprises selecting the application programming interface server, from among a plurality of application programming interface servers, that is able to fulfill the application programming interface request in a manner that meets a minimum quality threshold.

2. The method of claim 1, wherein the packet data network gateway performs a deep packet inspection on the application programming interface request to determine whether to route the application programming interface request to the guided network application programming interface server, wherein the packet data network gateway determines to route the application programming interface request to the guided network application programming interface server in response to determining that the application programming interface request is tagged for guidance by the guided network application programming interface server, and wherein the application programming interface request is tagged for guidance by the guided network application programming interface server based on the communication device being capable of having applications guided by the guided network application programming interface server.

3. The method of claim 1, wherein the packet data network gateway inspects the application programming interface request to determine whether the application programming interface request is tagged for fulfillment by the guided network application programming interface server, wherein the application programming interface request is fulfilled by the guided network application programming interface server acting as a proxy application programming interface server when the application programming interface request is tagged for fulfillment by the guided network application programming interface server.

4. The method of claim 1, wherein determining the application programming interface server to which to send the application programming interface request is further based upon demands of the application programming interface request.

5. The method of claim 1, wherein determining the application programming interface server to which to send the application programming interface request comprises selecting the application programming interface server, from among the plurality of application programming interface servers, based at least in part on the data indicating the context of the communication network in relation to the communication device.

6. The method of claim 1, wherein obtaining the data indicating the context of the communication network in relation to the communication device is performed continuously, and wherein the method further comprises updating the data indicating the context of the communication network in relation to the communication device.

7. The method of claim 1, further comprising:
sending the application programming interface request to the application programming interface server;
receiving an application programming interface response from the application programming interface server; and
sending the application programming interface response to the communication device from which the application programming interface request is received.

8. A guided network application programming interface server comprising:
a processor; and
a memory that stores instructions which, when executed by the processor, cause the processor to perform operations comprising:
receiving, an application programming interface request routed via a communication network to the guided network application programming interface server from a packet data network gateway, wherein the application programming interface request originates from a communication device, wherein the packet data network gateway receives the application programming interface request from a serving gateway of the communication network, and wherein the serving gateway receives the application programming interface request from an eNodeB that receives the application programming interface request from the communication device,
obtaining, from the application programming interface request, data indicating a context of the communication network in relation to the communication device, wherein the data indicating the context of the communication network in relation to the communication device is inserted in the application programming interface request by a mobile management entity of the communication network, the serving gateway of the communication network, and the packet data network gateway prior to the guided network application programming interface server receiving the application programming interface request, wherein the data indicating the context of the communication network in relation to the communication device comprises information about a location of the communication device, information regarding a speed at which the communication device is moving and a direction in which the communication device is moving, information regarding a device type of the communication device, information about a state of the communication device, and a quality of a service level associated with the communication device, wherein the information about the location of the communication device, the information regarding the device type of the communication device, and the information about the state of the communication device are provided by a home subscriber server to the mobile management entity, and wherein the information about the quality of the service level associated with the communication device is provided by the communication device, and
determining an application programming interface server to which to send the application programming interface request based at least in part on the data indicating the context of the communication network in relation to the communication device, wherein determining the application programming interface server to which to send the application programming interface request comprises selecting the application programming interface server, from among a plurality of application programming interface servers, that is able to fulfill the application programming interface request in a manner that meets a minimum quality threshold.

9. The guided network application programming interface server of claim 8, wherein the guided network application programming interface server is included within the communication network.

10. The guided network application programming interface server of claim 8, wherein determining the application programming interface server to which to send the application programming interface request comprises selecting the application programming interface server, from among the plurality of application programming interface servers, based at least in part on the data indicating the context of the communication network in relation to the communication device.

11. The guided network application programming interface server of claim 8, wherein the packet data network gateway performs a deep packet inspection on the application programming interface request to determine whether to route the application programming interface request to the guided network application programming interface server, wherein the packet data network gateway determines to route the application programming interface request to the guided network application programming interface server in response to determining that the application programming interface request is tagged for guidance by the guided network application programming interface server, and wherein the application programming interface request is tagged for guidance by the guided network application programming interface server based on the communication device being capable of having applications guided by the guided network application programming interface server.

12. The guided network application programming interface server of claim 8, wherein obtaining the data indicating the context of the communication network in relation to the communication device is performed continuously, and wherein the operations further comprise updating the data indicating the context of the communication network in relation to the communication device.

13. A computer readable storage device that stores instructions that, when executed by a processor of a guided network application programming interface server, cause the processor to perform operations comprising:
receiving an application programming interface request routed via a communication network to the guided network application programming interface server from a packet data network gateway, wherein the application programming interface request originates from a communication device, wherein the packet data network gateway receives the application programming interface request from a serving gateway of the communication network, and wherein the serving gateway receives the application programming interface request from an eNodeB that receives the application programming interface request from the communication device obtaining, from the application programming interface request, data indicating a context of the communication network in relation to the communication device, wherein the data indicating the context of the communication network in relation to the communication device is inserted in the application programming interface request by a mobile management entity of the communication network, the serving gateway of the communication network, and the packet data network gateway prior to the guided network application programming interface server receiving the application programming interface request, wherein the data indicating the context of the communication network in relation to the communication device comprises information about a location of the communication device, information regarding a speed at which the communication device is moving and a direction in which the communication device is moving, information regarding a device type of the communication device, information about a state of the communication device, and a quality of a service level associated with the communication device, wherein the information about the location of the communication device, the information regarding the device type of the communication device, and the information about the state of the communication device are provided by a home subscriber server to the mobile management entity, and wherein the information about the quality of the service level associated with the communication device is provided by the communication device; and determining an application programming interface server to which to send the application programming interface request based at least in part, on the data indicating the context of the communication network in relation to the communication device, wherein determining the application programming interface server to which to send the application programming interface request comprises selecting the application programming interface server, from among a plurality of application programming interface servers, that is able to fulfill the application programming interface request in a manner that meets a minimum quality threshold.

14. The computer readable storage device of claim 13, wherein the packet data network gateway performs a deep packet inspection on the application programming interface request to determine whether to route the application programming interface request to the guided network application programming interface server, wherein the packet data network gateway determines to route the application programming interface request to the guided network application programming interface server in response to determining that the application programming interface request is tagged for guidance by the guided network application programming interface server, and wherein the application programming interface request is tagged for guidance by the guided network application programming interface server based on the communication device being capable of having applications guided by the guided network application programming interface server.

15. The computer readable storage device of claim 13, wherein obtaining the data indicating the context of the communication network in relation to the communication device is performed continuously, and wherein the operations further comprise updating the data indicating the context of the communication network in relation to the communication device.

* * * * *